UNITED STATES PATENT OFFICE.

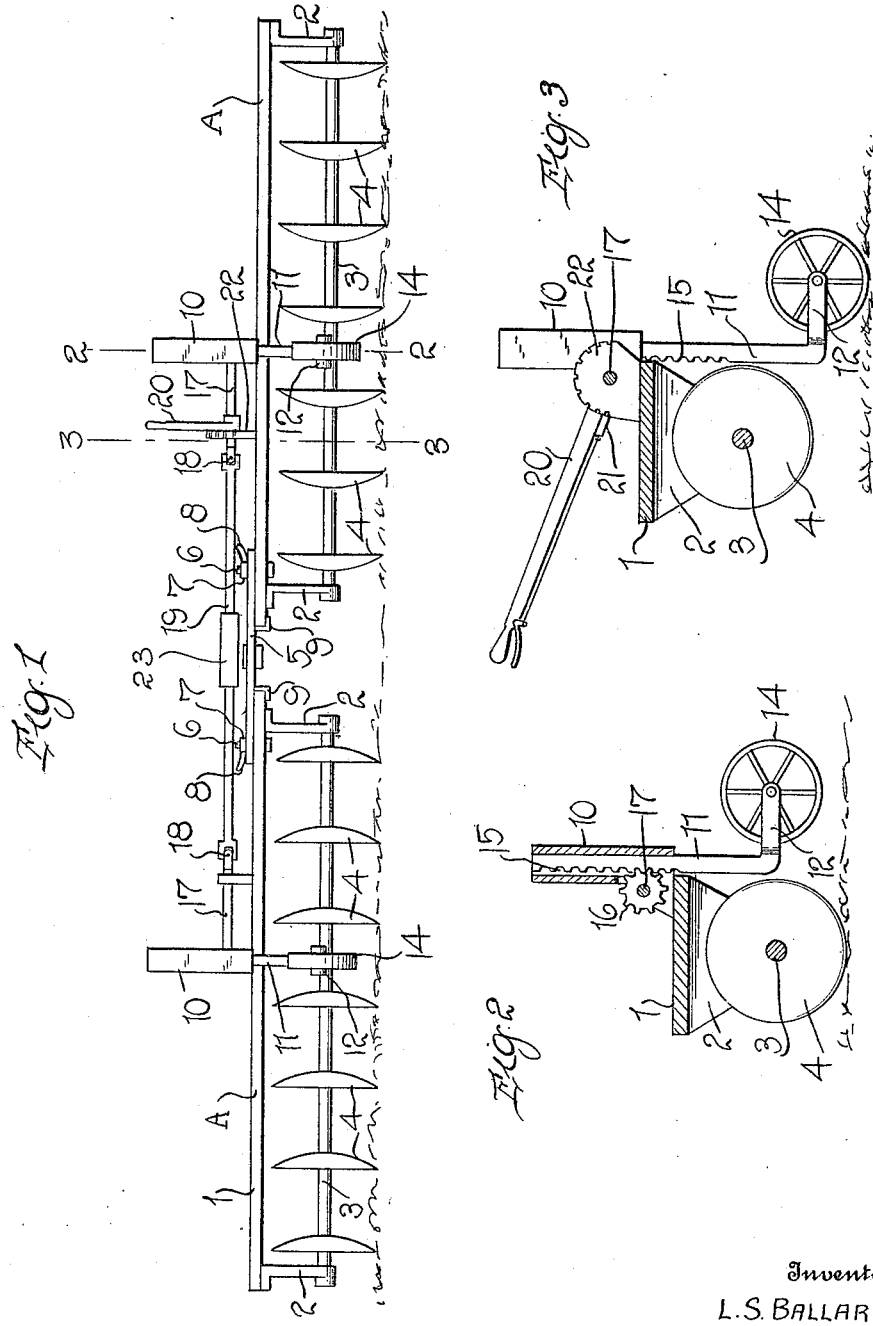

LEAVI S. BALLARD, OF HOLSTEIN, IOWA.

AGRICULTURAL IMPLEMENT.

1,136,579.     Specification of Letters Patent.     Patented Apr. 20, 1915.

Application filed June 29, 1914. Serial No. 848,020.

*To all whom it may concern:*

Be it known that I, LEAVI S. BALLARD, a citizen of the United States, residing at Holstein, in the county of Ida and State of Iowa, have invented certain new and useful Improvements in Agricultural Implements, of which the following is a specification, reference being had to the accompanying drawings.

This invention relates to certain improvements in agricultural implements and has relation more particularly to a device of this general character adapted to operate upon the soil; and the object of the invention is to provide a device of this general character having novel and improved means whereby the device may be bodily raised relative to the surface over which it travels in order to adjust the soil engaging means into or out of position to engage the soil.

The invention consists in the details of construction and in the combination and arrangement of the several parts of my improved device, whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a rear elevational view of an agricultural implement constructed in accordance with an embodiment of my invention; Fig. 2 is a sectional view taken substantially on the line 2—2 of Fig. 1; and Fig. 3 is a sectional view taken substantially on the line 3—3 of Fig. 1.

As disclosed in the accompanying drawings, A—A denote duplicate sections of a disk harrow and wherein 1 denotes a supporting frame of predetermined configuration and dimensions, having depending adjacent opposite extremities thereof, the bearing members 2, in which is suitably mounted a shaft 3 on which are affixed the disks 4. The inner or adjacent extremities of the supporting frames are adapted to be connected or united through the medium of a bridge member 5, to which the draft pole or other suitable draft rigging is adapted to be connected and, as herein disclosed, such bridge member comprises a flat plate having its extremities operatively engaged by the bolts 6 projecting upwardly through the frames 1 with their upper extremities engaged by the clamping members 7, each of which being provided with a wing 8 whereby the same may be applied or removed with convenience and facility, as is believed to be self-evident. In order to further assure the requisite coaction between the bridge member 5 and the frames 1, I have depending from the bridge member 5 the reversely directed angular brackets 9 depending therefrom and which are adapted to underlie the adjacent extremities of the frames 1.

Suitably secured to each of the frames 1 substantially midway thereof and at the inner longitudinal margins thereof is the upstanding guide bracket 10, in which is mounted for vertical sliding movement a shank 11, the lower extremity 12 whereof being angularly disposed in a direction rearwardly of the frame 1 and having mounted therein a caster wheel 14 or the like.

One longitudinal face of the shank 11 is provided with a rack surface 15 having in mesh therewith a suitable gear 16 carried by a shaft section 17 operatively supported upon the frame and having its inner extremity operatively engaged, through the medium of a conventional knuckle or universal joint 18, with the intermediate shaft section 19. By this arrangement, it will be readily perceived that upon axial rotation being imparted to either of the shaft sections 17, both of such sections will be caused to move in unison and thus raise or lower the shanks 11, whereby the agricultural machine will be bodily raised or lowered. This is especially desirable as it will be readily perceived that after the work has been completed the device may be so raised as to have the weight thereof carried solely by the wheels 14 whereby the device may be drawn with greater convenience.

In order to impart the requisite axial rotation to the shaft sections 17, I suitably affix to one of such sections the hand lever 20 provided with the conventional latch 21 adapted to coact with the rack 22. While in practice, I have found it of particular advantage to employ manual means for axially rotating the shaft sections, I wish to state that if the requirements of practice so permit other means may be employed with equal facility.

From the foregoing description, it is thought to be obvious that an agricultural implement constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

In order to compensate for the relative adjustments of the sections A, I find it of advantage to have the intermediate shaft 19 composed of two sections, with their inner or adjacent extremities slidably engaged with a coupling sleeve 23.

I claim:

An agricultural machine comprising a plurality of sections, means for connecting the adjacent extremities of the sections, a toothed shank carried by each of the sections, said section and shank being capable of vertical movement, ground engaging supports on said shanks, a shaft section carried by each of the sections operatively engaged with the toothed shank, an intermediate section operatively connecting the first named sections, and means carried by one of the first named sections for imparting rotation thereto whereby the machine will be bodily raised or lowered.

In testimony whereof I hereunto affix my signature in the presence of two witnesses.

LEAVI S. BALLARD.

Witnesses:
R. P. WHEATLEY,
CARL C. WOHLENBERG.

Copies of this patent may be obtained for five cents each, by addressing the "Commissioner of Patents, Washington, D. C."